United States Patent [19]

Tsuji et al.

[11] Patent Number: 4,676,152
[45] Date of Patent: Jun. 30, 1987

[54] APPARATUS FOR FRUIT FLY DISINFESTATION USING HOT HUMID AIR IN ORDER TO PREVENT THE SPREAD OF INFESTATION IN FRUITS AND VEGETABLES

[75] Inventors: Eiji Tsuji; Norio Igawa; Hiroshi Tabuchi; Tomoji Horiike, all of Tokyo, Japan

[73] Assignees: Takenaka Komuten Co.; Starlanes Corp., both of Japan

[21] Appl. No.: 804,118

[22] Filed: Dec. 3, 1985

[30] Foreign Application Priority Data

Aug. 9, 1985 [JP] Japan ................................. 60-176399

[51] Int. Cl.$^4$ ............................................. A23L 3/00
[52] U.S. Cl. ...................................... 99/468; 99/474; 99/476; 99/483; 99/516
[58] Field of Search .................. 99/467, 468, 473–477, 99/480, 483, 516, 536; 126/21 A, 369

[56] References Cited

U.S. PATENT DOCUMENTS

| 1,328,397 | 1/1920 | Rea et al. | 99/477 |
| 2,136,124 | 11/1938 | Berger | 99/477 X |
| 4,583,454 | 4/1986 | Huawg et al. | 99/468 |

Primary Examiner—Timothy F. Simone
Attorney, Agent, or Firm—Parkhurst & Oliff

[57] ABSTRACT

An apparatus for using hot humid air to prevent the spread of fruit fly infestation in fruits and vegetables. The apparatus includes a treating room, an air chamber located above the treating room and communicating therewith, a temperature and humidity regulator, and a ventilation arrangement. The apparatus allows accurate and uniform control of temperature and humidity, thereby minimizing damage to the treated fruits and vegetables.

5 Claims, 6 Drawing Figures

APPARATUS FOR FRUIT FLY DISINFESTATION USING HOT HUMID AIR IN ORDER TO PREVENT THE SPREAD OF INFESTATION IN FRUITS AND VEGETABLES

BACKGROUND OF THE INVENTION

1. Field of the Invention

The present invention relates to a fumigator or an apparatus for fruit fly disinvestation using hot humid air in order to prevent the spread of infestation over fruit and vegetables.

2. Description of the Prior Art

As a method of disinfestation of fruit flies in fruits and vegetables, a fumigation method employing EDB(ethylene dibromide) has been generally practiced. However, the use of EDB was prohibited in the United States in September, 1984, by reason of the fact that EDB is carcinogenic. Other methods using methyl bromide, radiation and so forth have also been known, but these may be harmful and expensive.

Conventional methods using hot humid air have also been known, but since the devices used in these methods have not yet been refined, these methods have the following disadvantages:

their applicability is extremely limited;

uniform treatment cannot be applied to the all of fruit and vegetables used;

the peel of treated fruits or other greengroceries tend to turn black;

some of the treated fruits and vegetables do not ripen or only ripen incompletely; and the flesh of treated fruits or other greengroceries tends to be hardened.

SUMMARY OF THE INVENTION

It is an object of the present invention to provide an apparatus arranged in such a manner that a temperature rise and humidification can be properly effected and temperature and humidity are kept uniform throughout the apparatus by accurately controlling the temperature and humidity of steam whereby the conventional problems may be solved.

To this end, the apparatus of this invention comprises: an air chamber for supplying hot humid air, being provided above a ceiling plate of a treating room; a plurality of outlets disposed under the ceiling plate; air flow control dampers and water sprays arranged at the respective outlets and skirts vertically suspended from the edge of the respective outlets, stands or roller conveyors being disposed on a floor under the respective outlets; suction inlets provided at suitable positions on the treating room; temperature and humidity regulators interposed between the inlets and the above-mentioned air chamber; and further appropriate ventilating devices provided in the treating room. In each temperature and humidity regulator, a filter, a heat exchanger, a fan and a humidifying device are arranged sequentially from the side of the inlet, with an outside air intake being provided at a suitable position, through which the temperature and humidity of steam can be controlled by a programmable controller.

In this case, treating boxes respectively having a ventilating bottom are superimposed or stacked in several layers and are securely laid on the roller conveyors under the respective outlets, while the treating boxes in the uppermost layer communicates with the skirts of the respective outlets. In the respective treating boxes, fruits and vegetables (for example, papayas) are laid or placed in such a manner that ventilation can be effected.

In operation, after the supply of outside air has been interrupted by closing an entrance and an exit of the treating room, the temperature and humidity regulator, as shown in FIG. 1, are actuated to properly supply heated or cold air of a predetermined temperature and humidity from the outlets on to the fruits and vegetables in the treating boxes while surplus humidity is reduced by ventilating with dry air as required, thus adjusting the humidity. After completion of the hot humid air treatment, the water sprays spray the treated fruits and vegetables with water in order to cool them. At this time the air flow control dampers of each outlet are adjusted so that the air flowing to each stack of treating boxes of fruits and vegetables can be uniform.

BRIEF DESCRIPTION OF THE DRAWINGS

Preferred embodiments in accordance with the present invention are shown in the drawings, in which.

DETAILED EXPLANATION OF THE INVENTION

Figure 1:
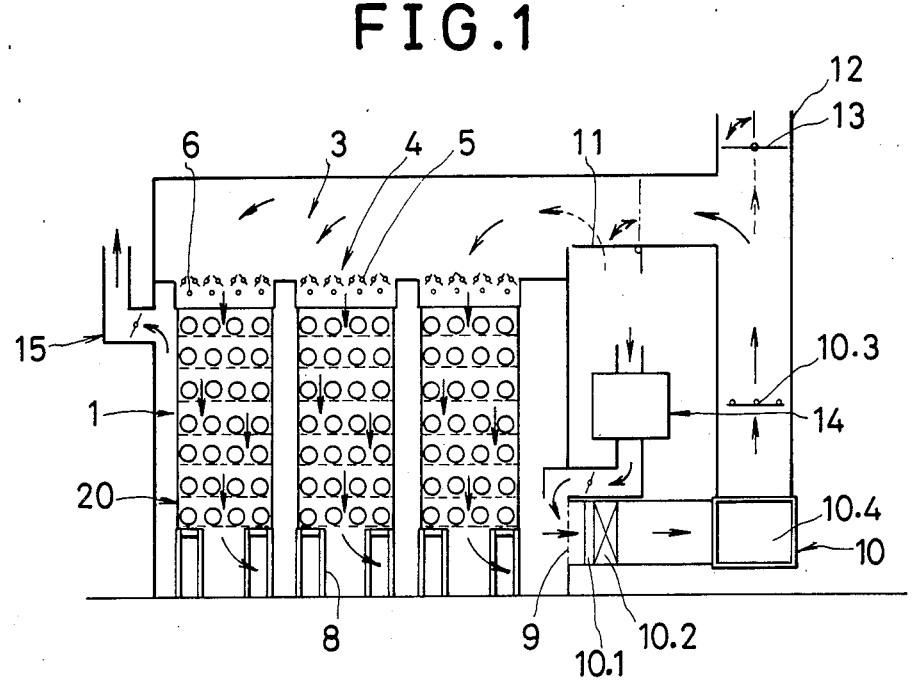
FIG. 1 is a schematic illustration explaining the structure of the apparatus in accordance with this invention.
Figure 2:
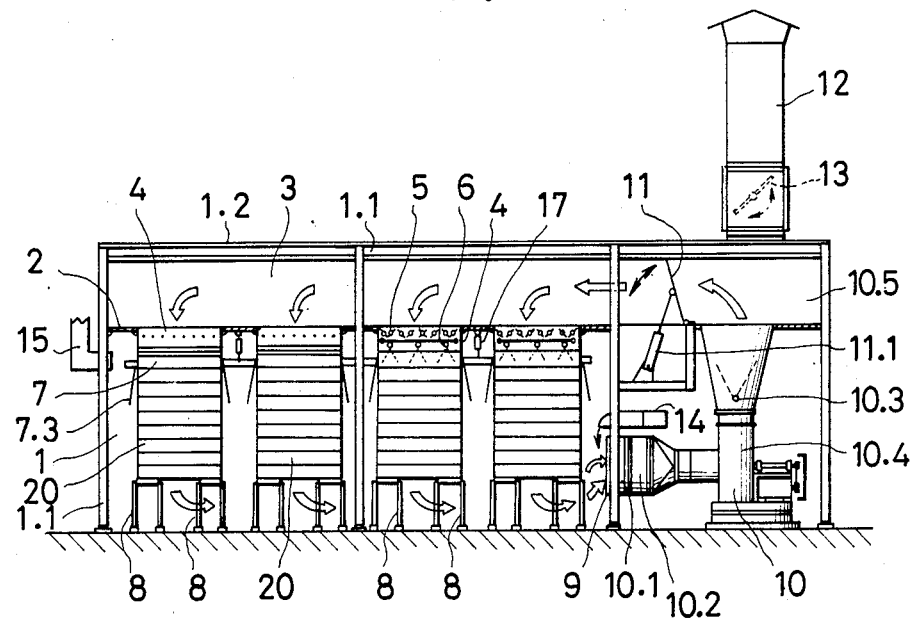
FIG. 2 is a front elevational cutaway view showing the apparatus of FIG. 1 in accordance with this invention.
Figure 3:
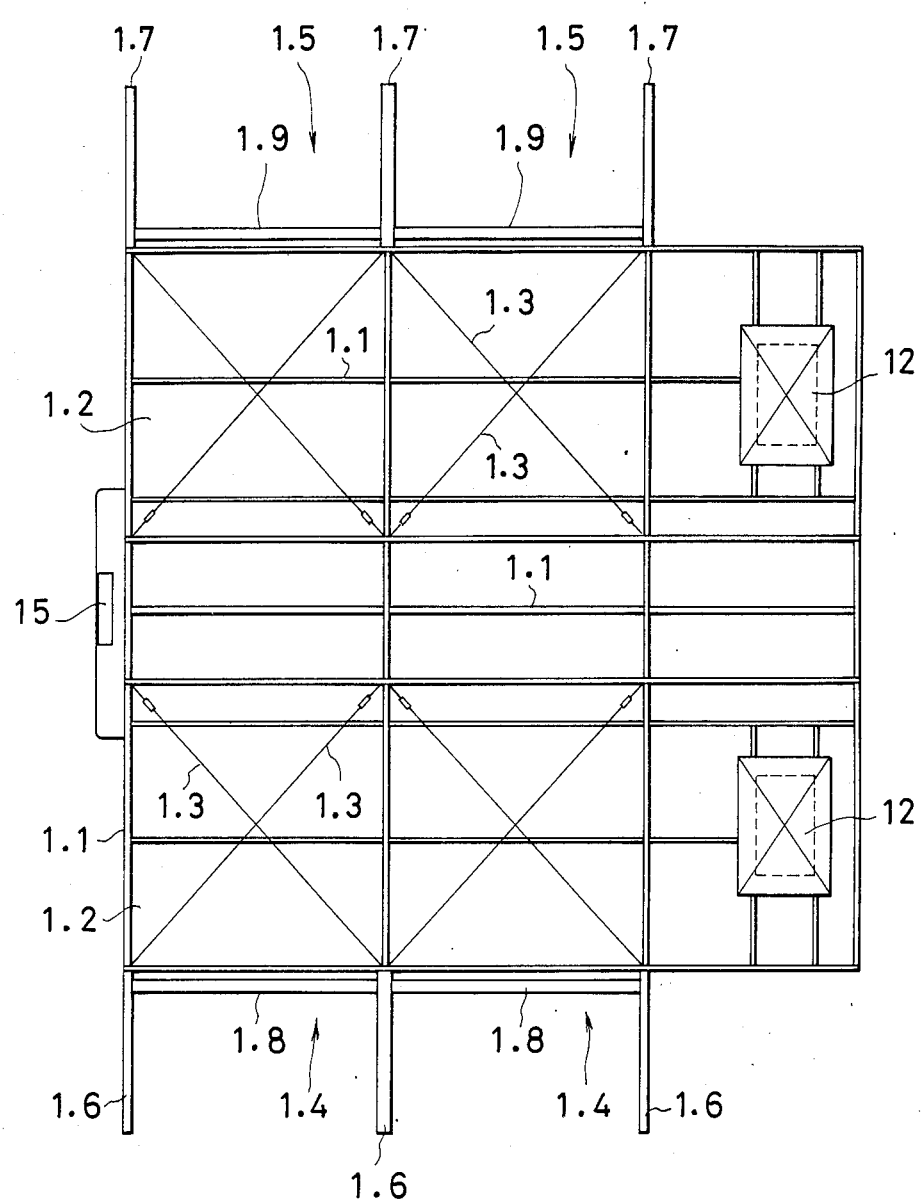
FIG. 3 is a top plan view of the apparatus in accordance with this invention.
Figure 4:
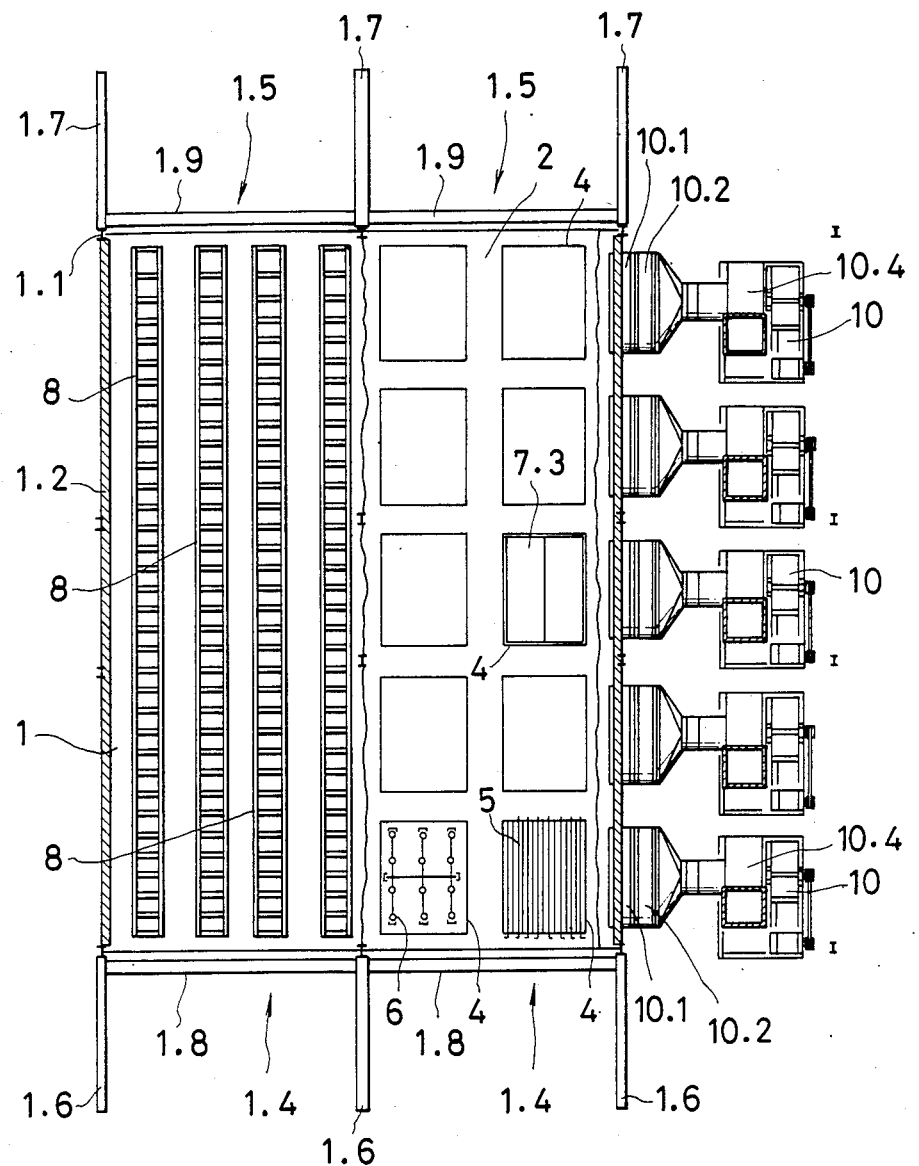
FIG. 4 is a top plan cutaway view showing the apparatus in accordance with this invention.
Figure 5:
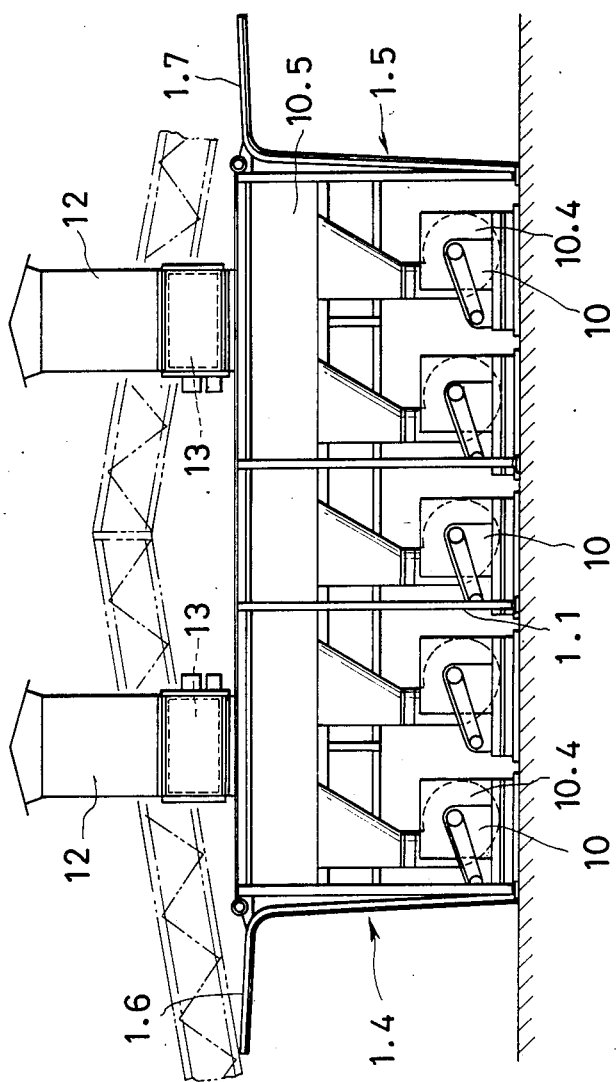
FIG. 5 is a side elevational view, partially in section, of the apparatus shown in FIG. 4.

Referring now to the drawings, reference numeral 1 denotes a treating room, reference numeral 2 denotes ceiling plates of the treating room, reference numeral 3 denotes an air chamber for supplying hot humid air arranged above the ceiling of the treating room, reference numeral 4 denotes outlets disposed under the ceiling plate, reference numeral 5 denotes air flow control dampers disposed at each outlet, reference numeral 6 denotes water sprays provided just below the dampers at each outlet, reference numeral 7 denotes a skirt suspended vertically from each outlet, reference numeral 8 denotes roller conveyors or stands disposed on the floor under each outlet, reference numeral 9 denotes inlets provided at the lower portion of the side wall of the treating room, reference numeral 10 denotes temperature and humidity regulators each of which is composed of a suction filter 10.1, a heat exchanger 10.2, a fan 10.4, a spray nozzle 10.3 as a humidifying device, an air duct 10.5, reference numeral 11 denotes air intake dampers provided on the air duct of the temperature and humidity regulators, reference numeral 12 denotes air exhaust ducts communicating with the steam duct, reference numeral 13 air exhaust dampers provided in the air exhaust duct, reference numeral 14 denotes dry air supply devices provided at the vicinity of the inlets, and reference numeral 15 denotes a surplus humid air exhaust device provided at a suitable position in the treating room.

The treating room 1 is formed such as to have a suitable capacity. The treating room 1 and air chambers 3 are assmbled with steel frames 1.1, panels 1.2 and bracing members 1.3 and so forth, and the front and rear sides of the room are left completely open so that the front side may function as an entrance 1.4 and the rear side as an exit 1.5. Oversliding doors 1.8, and 1.9 are mounted on reverse L-shaped door rails 1.6 and 1.7, arranged respectively at the entrance and the exit, in such a manner that the doors may move up and down.

Figure 6:
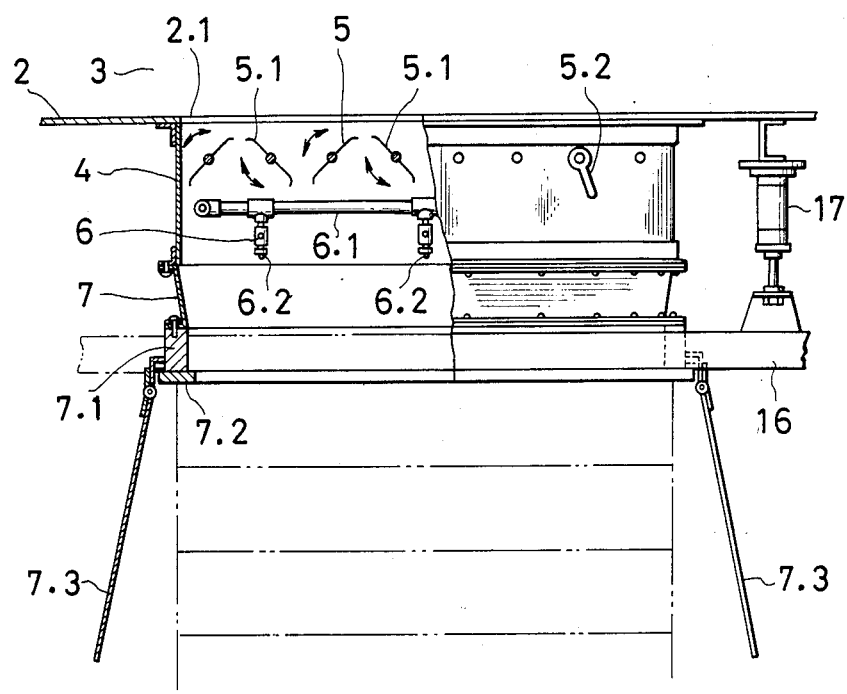
FIG. 6 is an enlarged front elevational view partially cut away, of the inside of the outlet of the apparatus in accordance with this invention.

As shown in FIG. 6, the outlet 4 is connected to an opening 2.1 made in the ceiling plate 2, and the upper portion of the outlet 4 is provided with air flow control dampers 5 which consist of a plurality of blades 5.1 which are disposed in series, while the lower portion is provided with water sprays 6 which consist of parallel pipes 6.1 wherein spray nozzles 6.2 are disposed at equal intervals. The dampers 5 are arranged to be adjustable by use of an adjusting handle 5.2 from the outside and the water sprays 6 communicate with water supply pipes via a valve (not shown in figure).

The respective skirts 7 formed of flexible material are suspended vertically from the outlet 4 with frame members 7.1 having a rectangular cross-section being connected to the lower end of the skirts packing 7.2 being attached to the bottom of the frame members, and double-leafed hinged plates 7.3 being provided on both sides of the frame members. The frame membes 7.1 are connected to lifting beams 16 which are supported by a plurality of air cylinders 17 hanging from the ceiling plates 2 in such a manner that the beam can move up and down.

The stands or roller conveyors 8 consist of several roller conveyors which successively extend straight from the entrance 1.4 to the exit 1.5.

In each temperature and humidity regulator 10, the suction filter 10.1, the heat exchanger 10.2 (for heating or cooling) and the fan 10.4 are arranged sequentially from the side of the inlet 9, and air is sent into the air chamber 3 through the air duct 10.5 in which the spray nozzle 10.3 for humidifying is provided (see FIG. 1).

The air intake dampers 11 for changing the passage of air are arranged on the end of the air duct 10.5 and are actuated by air cylinders 11.1 whereby the dampers can switch over from hot humid air flow through the air ducts 10.5 into the air chamber 3 to airflow from the outside thereinto.

The dry air supply devices 14, each of which consists of a dehumidifying air conditioner a proper duct and an auxiliary damper. The surplus humid air exhaust device 15 consists of a damper and an air exhaust duct.

The manner of the operation of this invention as comprised by the above construction will be described hereinafter. The treating room 1 is partitioned from the other areas and connects with a clean zone through the exits 1.5 of the room. In hot humid air treatment, fruit and vegetables (for example, papayas) are placed so as to be ventilated in a stack of treating boxes 20 having a ventilating bottom, the treating boxes 20 which are stacked in predetermined number of layers on the roller conveyors 8 and are placed under the respective outlets 4 while opening the oversliding doors 1.8 fitted over the entrance 1.4 of the treating room (with the exit 1.5 being closed).

Next, the air cylinder 17 is actuated to move the frame members 7.1 placed under the skirt 7 downwardly and packing 7.2 on the bottom of the frame members are brought into close contact with the upper edge of the treating box 20 at the uppermost layers. The oversliding door 1.8 of the entrance 1.4 are closed, and simultaneously the air intake dampers 11 are swung to open the passage from the temperature and humidity regulators 10 to the air chamber and the air exhaust dampers 13 are closed, thereby effecting a hot humid air treatment.

In this hot humid air treatment, as shown in FIG. 1, air is circulating through the outlets 4, the stacks of treating boxes 20, the treating room 1, the inlets 9, the temperature and humidity regulator 10 and the air chamber 3. The temperature and humidity of the circulating air is controlled at the temperature and humidity regulators 10 by the programmable controller (not shown in FIG. 1). The dry air supply devices 14 and the surplus humid air exhaust devices 15 are actuated as required.

The damper 5 of the respective outlets 4 is adjusted in advance by operating a handle 5.2 so that hot humid air can be sent uniformly.

In this case, hot humid air sent from the respective outlets 4 is maintained in a uniform condition with respect to wind pressure, wind velocity, by passing through the air chamber 3.

The average wind velocity of hot humid air from the respective outlets 4 is preferably set in the range of 0.5 m/s to 3.0 m/s.

Using the case of papayas as an example, the process of this hot humid air treatment is as follows.

The quarantine requirement for vapor heat treatment is that the temperature at the center of the papaya fruit must be brought up to 117 degrees F. under saturated conditions. When this temperature is attained, the treatment is considered to be completed with no stipulation as to time required to reach this temperature.

However, since a papaya is very delicate, troubles such as peel damage, hardened flesh, failure to ripen completely and so forth arise in hot conditions or due to abrupt changes in temperature and this causes the commercial value drop remarkably.

It is therefore critical that the temperature of all the papayas to be treated rise slowly and that there is only a small difference in the rates by which the temperature of the individual papayas rises. When the rising rates of temperature of the individual papayas are differed from each other, some papayas rise in temperature at their center to 117° F. before the rest papayas rise to 117° F., being subjected consequently to high temperature for a longer time than the rest. As a result, the probability that troubles may arise is increased.

From this viewpoint, the apparatus of this invention enables the temperature and humidity of hot humid air to be accurately set as desired and all of the papayas to be treated uniformly exposed to hot humid air by effective ventilation, the entire treating process can be carried out uniformly. Additionally the temperature and humidity of hot humid air which blows out from the relevant outlet is gradually raised until water vapor saturated hot air of a temperature of 120° F. is eventually obtained, whereby abrupt changes in temperature of the papayas are prevented and the temperature at the center of each papaya reaches 117° F. without exposing the papayas to high temperatures for too long. This completes the whole process satisfactorily.

It will be readily seen from the above description that the apparatus of this invention can be adapted to treat any type of fruits and vegetables, and that it is possible to effect the most suitable treatment for each type.

After the treatment has been completed, the air intake dampers 11 are actuated so as to close the passage from the temperature and humidity regulator 10 through the air duct 10.5 to the air chamber and open the air duct to the outside air while the air exhaust dampers 13 are opened. Then, an operating fan of the temperature and humidity regulator 10 exhausts hot humid air from the treating room 1 through the air exhaust ducts 12 while outside air is taken into the treating room 1 to replace hot humid air, and simultaneously the water sprays 6 spray water onto the treated fruit and vegetables to quickly cool them.

In the next step, the air cylinder 17 is actuated to pull up the skirt 7 and the frame member 7.1, and after the oversliding doors 1.9 on the side of of the exits 1.5 are opened, all the treating boxed 20 are transfered into the clean zone. Upon completion of the transfer, the oversliding doors 1.9 are quickly closed so as to prevent the clean zone from being contaminated.

In the event that some of the outlets 4 are not to be used because the quantity of fruits and vegetables to be treated is small, the unneeded outlets may be closed by means of the double-leafed hinged plates 7.3 equipped thereunder.

In the embodiment referred to in this specification, the frame 7.1 and the skirt 7 are moved up and down by the air cylinder, but it may also be moved by using other electric driving devices or manually.

In the present invention, it is possible to carry out various kinds of disinfestation treatment for various food to be treated efficiently, and this increases the applicability of the present invention.

Furthermore, uniform treatment can be effected throughout the treating room and boxes, so that it is possible to solve all the problems which arise in conventional disinfesting treatment using hot humid air such as peel damage by heat, failure to completely ripen, hardened flesh and so forth. It is thus possible to prevent any drop in the commercial value of the fruit and vegetables having been treated.

What is claimed is:

1. An apparatus for using hot humid air to prevent the spread of fruit fly infestation in fruits and vegetables, said apparatus comprising:

container means for holding the fruits and vegetables to be treated;

a treating room in which said container means is arranged, said treating room comprising a plurality of walls, a floor and a ceiling plate;

an air chamber provided above said ceiling plate;

a plurality of outlets extending from said air chamber below said ceiling plate;

a temperature and humidity regulator, said temperature and humidity regulator comprising an air duct having a first end which communicates with an inlet disposed in one of said plurality of walls and a second end which communicates with said air chamber, a fan located between said inlet and said first end of said air duct for sucking air into said inlet and blowing air into said air duct at said first end of said air duct and a regulator device for regulating the temperature and humidity of air flowing from said inlet to said air duct;

a ventilating device for ventilating said treating room;

container stands for supporting said container means, each of said container stands being disposed on said floor of said treating room below one of said plurality of outlets;

air flow control dampers arranged in each of said plurality of outlets;

water sprays arranged in each of said plurality of outlets; and skirts suspended from each of said plurality of outlets, said skirts being adapted to provide substantially air tight communication between each of said plurality of outlets and a container means.

2. The apparatus for using hot humid air to prevent the spread of fruit fly infestation in fruits and vegetables of claim 1, wherein said temperature and humidity regulator further comprises a suction filter proximate said inlet, a heat exchanger located between said suction filter and said fan, and a humidifying device located between said fan and said air duct.

3. The apparatus for using hot humid air to prevent the spread of fruit fly infestation in fruits and vegetables of claim 1, wherein said ventilating device comprises an exhaust duct and exhaust damper arrangement in communication with said air duct, an outside air intake disposed on said air duct between said exhaust duct and said air chamber, and an air intake damper movable between an open and a closed position, wherein when said air intake damper is in said closed position said air chamber communicates with said air duct and said exhaust damper is in a closed position, and when said air intake damper is in said open position said air chamber is in communication with outside air and said exhaust damper is in an open position.

4. The apparatus for using hot humid air to prevent the spread of fruit fly infestation in fruits and vegetables of claim 1, further comprising frame members provided on lower edges of each of said skirts, and wherein said skirts are formed of a flexible material such that said frame members are displaceable in a direction substantially perpendicular to said ceiling plate.

5. The apparatus for using hot humid air to prevent the spread of fruit fly infestation in fruits and vegetables of claim 1, wherein each of said container stands comprise a plurality of roller conveyors extending from an entrance to said treating to an exit from said treating room.

* * * * *